United States Patent Office 3,204,735
Patented Sept. 7, 1965

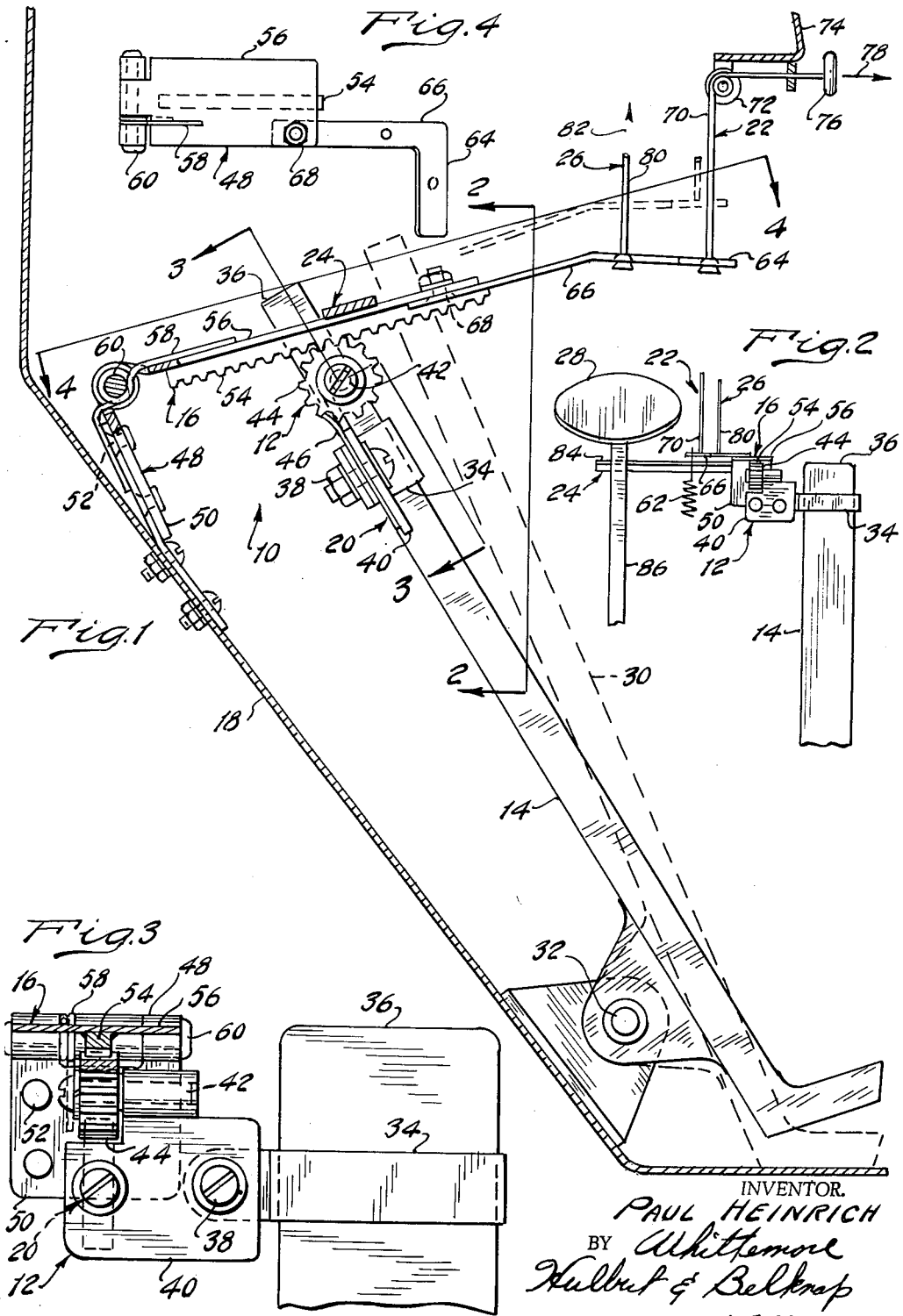

3,204,735
ACCELERATOR CONTROL DEVICE
Paul Heinrich, 4150 E. Lawn, Detroit 15, Mich.
Filed July 30, 1962, Ser. No. 213,263
6 Claims. (Cl. 192—3)

The invention relates to speed control devices and refers more specifically to structure adapted to be connected to a vehicle accelerator pedal for maintaining the accelerator pedal in selected positions whereby the speed of the vehicle is maintained substantially constant at selected speeds.

With the trend toward limited access highways and long distance traveling there is a need for a device to maintain the speed of vehicles traveling on the highways substantially constant over extended periods of time without the necessity of manually holding a throttle valve or accelerator pedal in an open position against a bias applied thereto.

Prior devices for accomplishing this desired result have been relatively complicated and therefore tend to be unreliable and expensive.

It is therefore one of the objects of the present invention to provide improved means for maintaining the speed of a vehicle substantially constant at selected speeds without the necessity of manually holding a speed control member in a predetermined position.

Another object is to provide rack and pinion means operable between a vehicle accelerator pedal and vehicle fire wall to maintain the vehicle accelerator pedal in any adjusted position thereof whereby the vehicle throttle opening and therefore vehicle speed is maintained substantially constant.

Another object is to provide a speed control device for maintaining the speed of a vehicle substantially constant including a pinion assembly secured to the vehicle accelerator pedal, means for permitting rotation of the pinion assembly in only one direction, rack means secured to the vehicle fire wall and resilient means for urging the rack means into engagement with the pinion means whereby the accelerator pedal is held in any predetermined adjusted position thereof.

Another object is to provide a speed control device as set forth above including means for disengaging the rack and pinion means on application of the vehicle brakes.

Another object is to provide a speed control device as set forth above including means for disengaging the rack and pinion means on actuation of the vehicle clutch.

Another object is to provide a speed control device as set forth above including manual means for disengaging the rack and pinion means.

Another object is to provide a speed control device which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation view of a speed control device constructed in accordance with the invention connected between the accelerator pedal and fire wall of a vehicle.

FIGURE 2 is a reduced partial view of the speed control device illustrated in FIGURE 1 taken substantially on the line 2—2 in FIGURE 1 illustrating a modification of the bias spring for the rack assembly.

FIGURE 3 is a partial section view of the speed control device illustrated in FIGURE 1 taken substantially on the line 3—3 in FIGURE 1.

FIGURE 4 is a reduced partial view of the speed control device illustrated in FIGURE 1 taken on the line 4—4 in FIGURE 1.

With particular reference to the figures of the drawing one embodiment of the present invention will now be considered in detail.

As shown best in FIGURE 1 the speed control device 10 of the invention comprises a pinion assembly 12 secured to a vehicle accelerator pedal 14, a rack assembly 16 secured to a vehicle fire wall 18 and structure 20 for permitting rotation of the pinion assembly 12 in only a clockwise direction. The speed control device 10 is completed by the manual mechanism 22 for disengaging the pinion and rack assemblies 12 and 16 and the mechanisms 24 and 26 responsive to actuation of the vehicle brakes and clutch respectively to disengage the pinion and rack assemblies 12 and 16.

In operation, as the accelerator pedal 14 is depressed the rack assembly 16 engaged with the pinion assembly 12 will maintain the accelerator pedal in any selected depressed position in conjunction with structure 12 which prevents counterclockwise movement of pinion assembly 12 whereby the usual throttle valve or other vehicle speed control means connected to the accelerator pedal may be maintained in a selected open position without the necessity of manually holding the accelerator pedal in a depressed position against the usual spring bias thereof. With the speed control device 10 the accelerator pedal 14 may be released from a particular depressed position thereof on actuation of the manual mechanism 22 or on depression of the vehicle brake pedal 28 or actuation of the vehicle clutch (not shown).

More specifically, as shown in FIGURE 1, the usual vehicle accelerator pedal 14, which as will be readily recognized in the usual installation is connected to a throttle operable to control vehicle speed in accordance with the position of the accelerator pedal and is spring biased in an outermost position as indicated by the dotted lines 30, is pivotally connected to the fire wall 18 of the vehicle by pivotal connection 32 therebetween. Thus in the usual installation the speed of the vehicle to which the accelerator pedal 14 is attached will be increased as the accelerator pedal is pivoted in a counterclockwise direction about the pivotal connection 32 and will be held substantially constant when the accelerator pedal 14 is held in a substantially constant position.

The pinion assembly 12 includes the clamp 34 completely surrounding the end 36 of the accelerator pedal 14 and rigidly secured thereto by means of the bolts 38 and the bracket 40 which may be constructed from a portion of a hinge for rotatably supporting a pinion shaft 42 which bracket is secured to the clamp 34 by the bolts 38. Pinion assembly 12 is completed by the pinion shaft 42 rotatably secured in the bracket 40 and rotatably mounting the pinion 44.

The structure for preventing rotation of the pinion assembly in one direction comprises the leaf spring 46 carried by the clamp 34 and bracket 40 and secured thereto by means of one of the bolts 38. The leaf spring 46 cams over the teeth of the pinion as the pinion is rotated clockwise, as shown in FIGURE 1, and provides a rigid abutment engageable with a tooth of the pinion 44 to prevent the pinion from being rotated in a counterclockwise direction.

The rack assembly 16 includes a hinge or hasp member 48, the short leaf 50 of which is secured to the fire wall 18 or other fixed abutment within the automobile passenger compartment by means of the bolts 52 and a rack 54 secured to the long leaf 56 of the hinge. In addition, a spring 58 which is wrapped around the pivot member 60 of the hinge 48 and extends on the back sides of both of the leaves thereof is provided in the rack assembly 16 to bias the rack 54 into engagement with the pinion 44.

Alternatively a spring 62 extending between the end 64 of the rack assembly 16 and the vehicle fire wall 18 may be provided to bias the rack 54 into engagement with the pinion 44, as shown in FIGURE 2, in place of the spring 58 illustrated in FIGURE 1. The spring 58 is however the preferred construction since it does not interfere with normal movement of a foot engaged with the accelerator pedal 14.

The manually actuable mechanism 22 for disengaging the rack 54 and pinion 44 is provided to permit release of the accelerator pedal 14 whereby it may be returned to the dotted line position 30 by the usual spring bias therefor. The mechanism 22 includes the L-shaped bracket 66 secured to the leaf 56 of the hinge 48 by convenient means, such as the bolt 68, the elongated linear member 70 secured thereto, pulley 72 attached to the vehicle dash-board 74 and the pull handle 76 secured to the end of the linear member 70 at the dash-board 74.

In operation, on pulling of the pull handle 76 in the direction of arrow 78 the linear member 70 is passed over pulley 72 to pivot the hinge leaf 56 in a counterclockwise direction about the pivot means 60 therefor to disengage the rack 54 from the pinion 44.

The clutch actuated mechanism 26 for disengaging the rack 54 from pinion 44 similarly includes a linear member 80 secured to the bracket 66 at one end thereof and connected at the other end to clutch actuating means (not illustrated) whereby on actuation of the clutch tension is applied to the linear member 80 in the direction of arrow 82. Thus the hinge member 56 is again pivoted counterclockwise on actuation of the vehicle clutch to disengage the rack 54 from the pinion 44.

The mechanism 24 for disengaging the rack 54 from the pinion 44 on actuation of the vehicle brakes comprises the bar 84 rigidly secured to the hinge leaf 56 and extending behind the brake pedal shaft 86, as illustrated best in FIGURE 2. Thus, as the brake pedal 28 is depressed in the normal brake installation wherein the shaft 86 of the brake pedal is non-linear the shaft 86 will contact the bar 84 and again pivot the rack 54 in a counterclockwise direction in opposition to the spring bias acting thereon to disengage the rack 54 and pinion 44.

The mechanism 24 for disengaging the rack 54 from the pinion 44 on actuation of the vehicle brakes comprises the bar 84 rigidly secured to the hinge leaf 56 and extending behind the brake pedal shaft 86, as illustrated best in FIGURE 2. Thus, as the brake pedal 28 is depressed in the normal brake installation wherein the shaft 86 of the brake pedal is non-linear the shaft 86 will contact the bar 84 and again pivot the rack 54 in a counterclockwise direction in opposition to the spring bias acting thereon to disengage the rack 54 and pinion 44.

In over-all operation of the speed control device 10 when it is desired to travel at a substantially constant speed, such as on a limited access highway with little traffic thereon, the rack 54 is allowed to engage the pinion 44 by releasing the manual disengaging mechanism 22. The accelerator pedal 14 is then depressed to a position giving the desired speed. On depression of the accelerator pedal 14 the pinion 44 engaged with the rack 54 will be rotated in a clockwise direction along the rack 54 which will be held engaged therewith due to the spring bias acting on rack 54 tending to lower the rack 54 as the accelerator pedal is depressed.

When the accelerator pedal 14 has been depressed to provide the desired speed the operator's foot may be removed therefrom. The accelerator pedal 14 will not assume the normal neutral position thereof indicated at 30 since clockwise pivoting of the accelerator under the urging of the usual spring bias acting thereon is prevented due to the connection between the pinion 44 and rack 54 and the operation of the structure 46 for preventing counterclockwise rotation of the pinion 44.

Should the vehicle operator at any time desire to regain manual control of the position of the accelerator pedal he need only pull the handle 76 in the direction of arrow 78 or actuate the vehicle clutch or apply the vehicle brakes to cause disengagement of the rack 54 and pinion 44 in the manner considered above.

While one embodiment of the present invention and one modification thereof have been disclosed in detail, it will be understood that other embodiments and modifications are contemplated. It is intended to include all embodiments and modifications of the disclosed invention defined by the appended claims within the scope of the invention.

What I claim as my invention is:

1. A speed control device for maintaining the speed of a vehicle, including a throttle controlling accelerator pedal, a fire wall, clutch and brake means, substantially constant, comprising pinion means secured to the accelerator pedal, means engaged with the pinion means for preventing rotation of the pinion means in one direction, rack means secured to the fire wall of the vehicle including a hinge having a pair of leaves and a pivot, one leaf of which is rigidly secured to the fire wall of the vehicle and a rack secured to the other leaf of the hinge, resilient means biasing the rack means into engagement with the pinion means.

2. Structure as set forth in claim 1 wherein the resilinet means urging the rack means into engagement with the pinion means comprises a spring secured to the free end of said other leaf of said hinge and to the fire wall of the vehicle.

3. Structure as set forth in claim 1 wherein the resilient means urging the rack means into engagement with the pinion means comprises a spring, the central portion of which is wrapped around the pivot of the hinge and the ends of which extend behind the outer sides of the hinge leaves.

4. A speed control device for maintaining the speed of a vehicle, including a throttle controlling accelerator pedal, a fire wall, clutch and brake means, substantially constant, comprising pinion means secured to the accelerator pedal including a clamp secured to the accelerator pedal, a supporting bracket connected to the clamp for rotatably mounting a pinion shaft, a pinion shaft rotatably mounted in the supporting bracket, and a pinion secured to the pinion shaft, means engaged with the pinion for preventing rotation of the pinion in one direction, rack means secured to the fire wall of the vehicle, resilient means biasing the rack means into engagement with the pinion means, and separate manually actuable means, and means responsive to the brake and clutch means for disengaging the pinion and rack means.

5. A speed control device for maintaining the speed of a vehicle, including a throttle controlling accelerator pedal, a fire wall, clutch and brake means, substantially constant, comprising pinion means secured to the accelerator pedal, means engaged with the pinion means for preventing rotation of the pinion means in one direction, rack means secured to the fire wall of the vehicle, resilient means biasing the rack means into engagement with the pinion means, and separate manually actuable means, and means responsive to the brake and clutch means for disengaging the pinion and rack means including a rigid bar extending transversely of the rack means and rigidly secured thereto engageable with the brake means on actuation thereof.

6. A speed control device for maintaining the speed of a vehicle, including a throttle controlling accelerator pedal and a fire wall, substantially constant, comprising pinion means secured to the accelerator pedal, including a clamp secured to the accelerator pedal, a supporting bracket connected to the clamp for rotatably mounting a pinion shaft, a pinion shaft rotatably mounted in the supporting bracket, and a pinion secured to the pinion shaft, means engaged with the pinion for preventing rotation of the pinion in one direction, rack means secured to the fire wall of the vehicle including a pair of leaves and a pivot, one leaf of which is rigidly secured to the fire wall of the vehicle and a rack secured to the other leaf of the hinge, resilient means biasing the rack means into engagement with the pinion means, and separate manually actuable means for disengaging the pinion and rack means.

References Cited by the Examiner

UNITED STATES PATENTS

| | | |
|---|---|---|
| 2,076,460 | 4/37 | Heinrich. |
| 2,228,569 | 1/41 | Johnson _____ 74—530 |
| 2,503,802 | 4/50 | Coutcher. |

FOREIGN PATENTS

| | | |
|---|---|---|
| 24,771 | 1902 | Great Britain. |

DAVID J. WILLIAMOWSKY, *Primary Examiner.*